United States Patent [19]

Moen

[11] Patent Number: 4,708,583
[45] Date of Patent: Nov. 24, 1987

[54] PROCESS OF RECUBING BOXES

[76] Inventor: Lenard E. Moen, 12333 E. Los Nietos Rd., Santa Fe Springs, Calif. 90670

[21] Appl. No.: 810,215

[22] Filed: Dec. 18, 1985

Related U.S. Application Data

[62] Division of Ser. No. 479,800, Mar. 23, 1983, abandoned.

[51] Int. Cl.$^4$ .............................................. B30B 13/00
[52] U.S. Cl. ...................................... 414/786; 414/28; 414/39; 414/338; 414/373; 414/759; 414/773; 414/783
[58] Field of Search .................... 414/38, 39, 102, 338, 414/373, 759, 786, 28, 36, 110, 763, 764, 766, 405, 416, 783, 773

[56] References Cited

U.S. PATENT DOCUMENTS

| 2,394,693 | 2/1946 | Golrick | 414/373 |
| 3,788,496 | 1/1974 | Webb et al. | 414/28 X |
| 4,439,093 | 3/1984 | Victoriao | 414/28 X |

Primary Examiner—Robert J. Spar
Assistant Examiner—Janice Krizek
Attorney, Agent, or Firm—Frederick E. Mueller

[57] ABSTRACT

A method and apparatus for automatically restacking palletized tiers of adjacent rows of loosely cubed laden produce boxes in a continuous fashion by recubing the boxes while automatically retrieving and stacking the successive pallets during the continuing recubing process.

5 Claims, 22 Drawing Figures

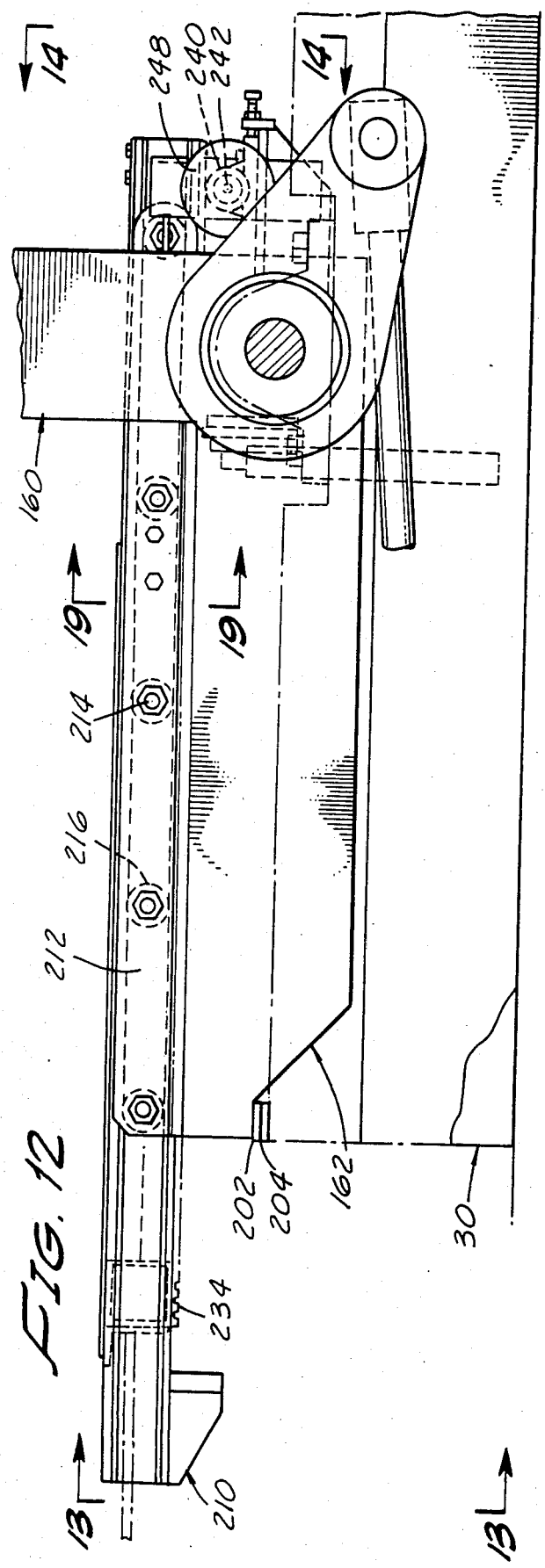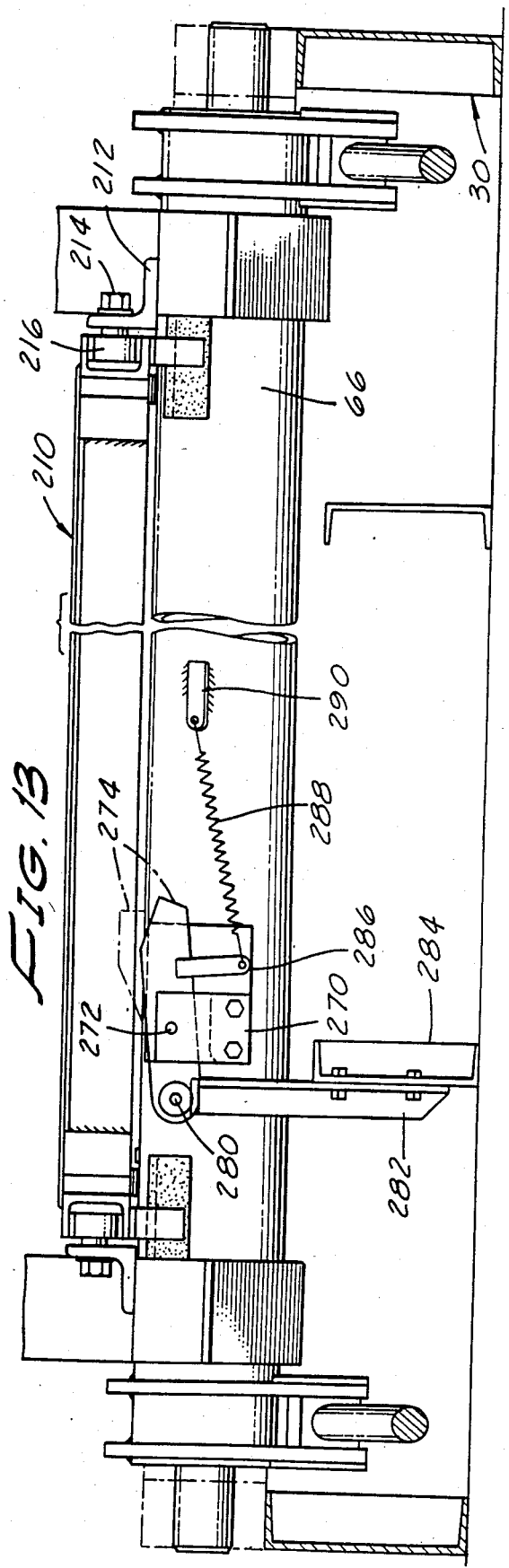

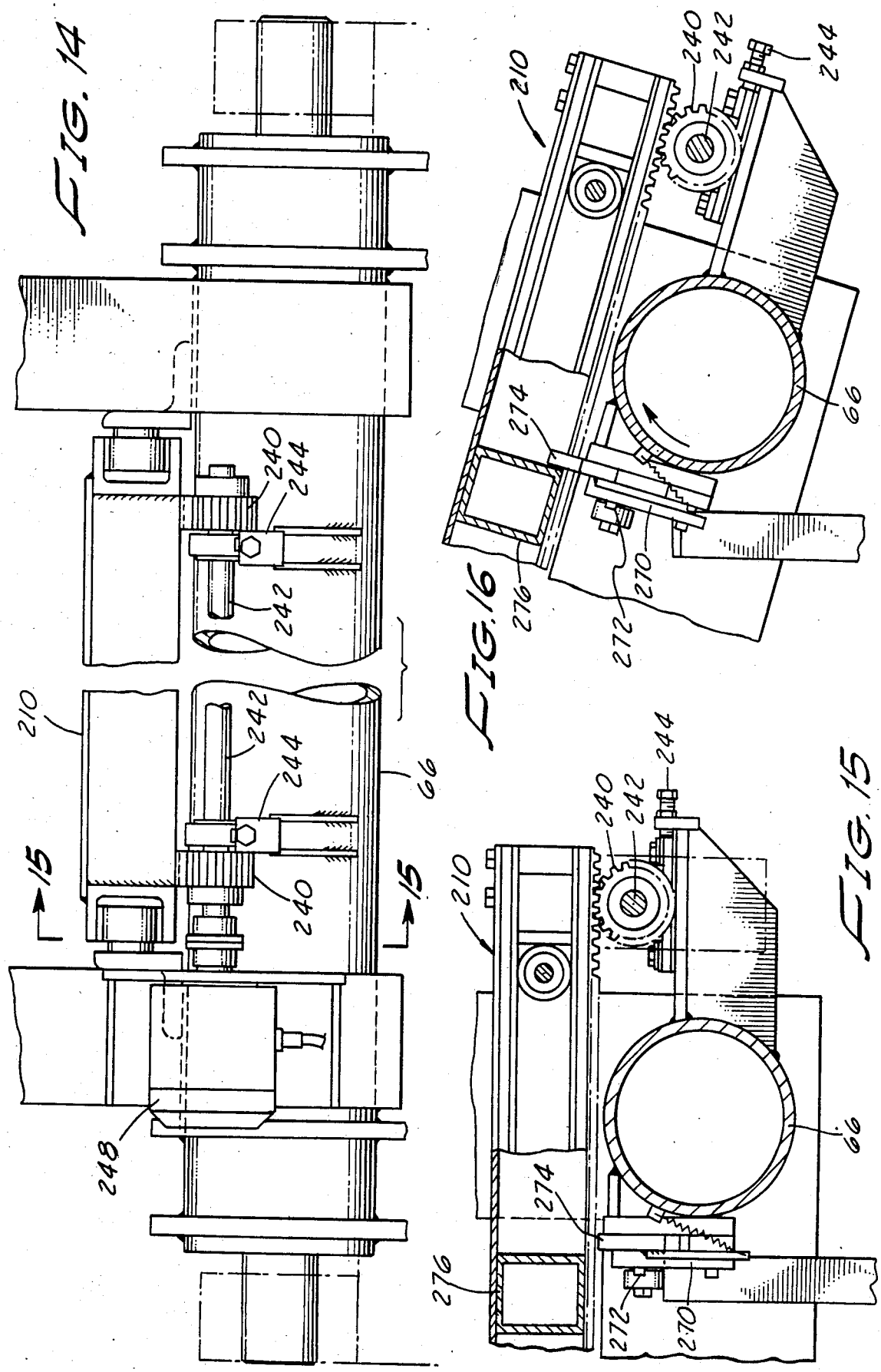

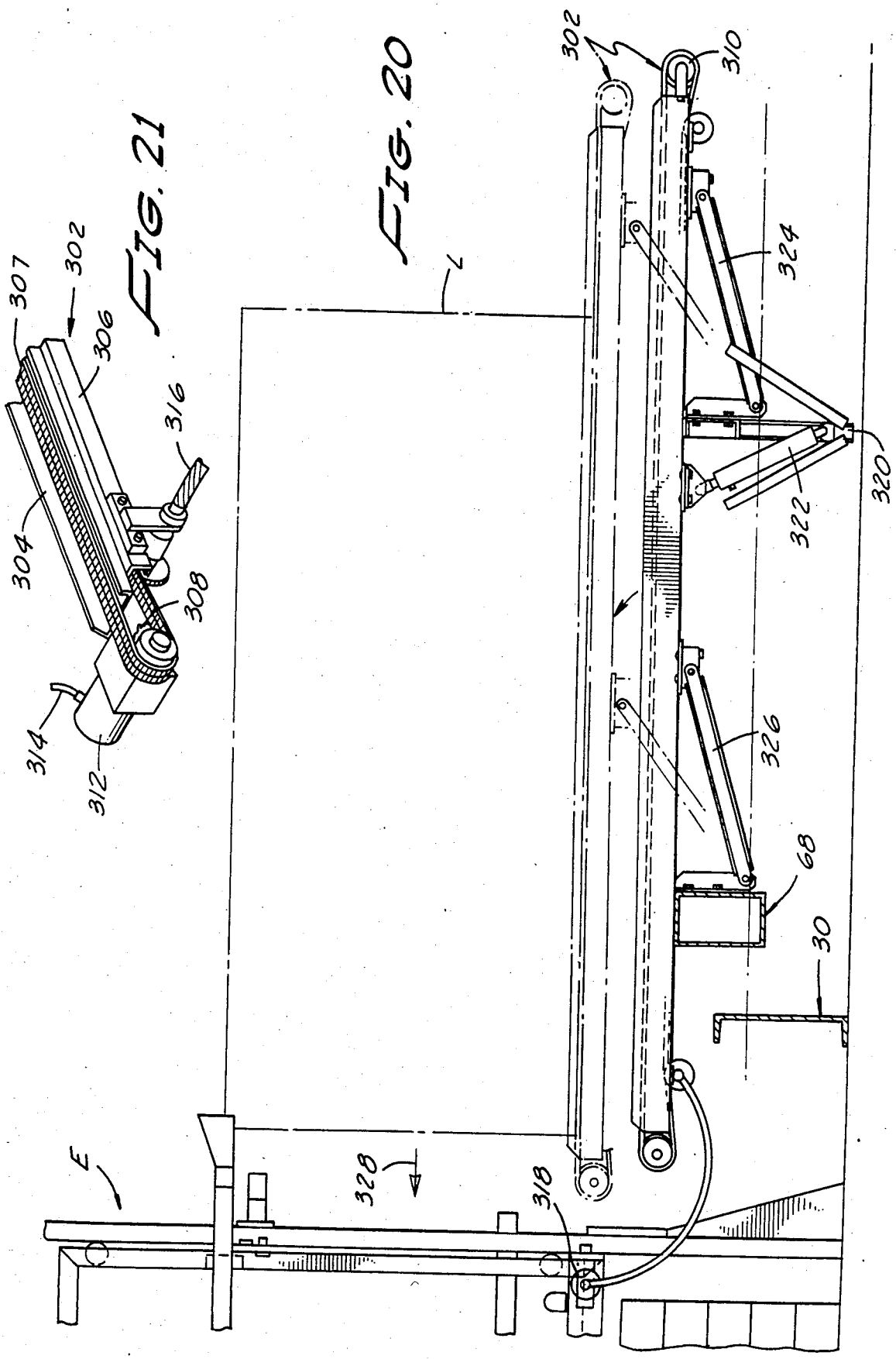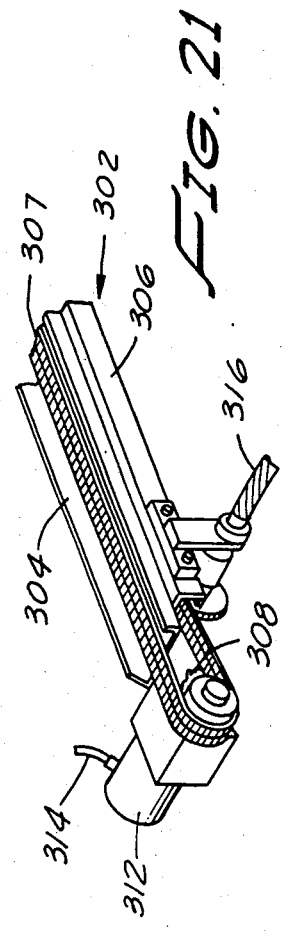

PROCESS OF RECUBING BOXES

CROSS REFERENCE TO RELATED APPLICATION

This application is a division of my co-pending application Ser. No. 479,800 filed Mar. 23, 1983, and now abandoned.

BACKGROUND OF THE INVENTION

The present invention relates in general to the handling of palletized laden containers in a manner to transfer tiers of the containers from their pallets in the form of a neatly cubed stack. More particularly, the invention relates to the automatic handling of successive pallets loaded with tiers of filled produce boxes in a manner to automatically extricate the pallet from the stack of boxes and to tightly cube a desired number of tiers of the boxes in order to maximize efficient use of the so called cube space of the cargo vehicle into which tiers of the boxes are loaded.

Boxes which have been filled with produce, e.g., heads of lettuce, and sealed are hand loaded on 40"×90" pallets, six tiers high in the field. Clamp type trucks pick up one or more tiers of boxes on one pallet and transfer them to another pallet in a process of restacking to final pre-determined load heights of up to eight tiers. In this process clamping pressure is applied to the box side walls of two rows of boxes, one or more tiers high, with sufficient force to resist their falling during the restacking operation. The clamping operation damages both product and container.

Each pallet load, when received from the field, has a slip sheet of corrugated board placed between the boxes and pallet. After the restacking operation, large platform fork lift trucks with hydraulic operated buck boards and slip sheet grips are used to grab the slip sheet and transfer the load from pallet to platform. If the slip sheet tears (a common occurence) another for lift must be used in the operation to push the stubborn load off the pallet and onto the fork platform. This "two fork lift" alternate method of transfer adds to produce and container damage plus undesirable abuse to pallets.

Hand loading, trucking to the cooler,and fork lift handling before and after cooling contributes to a very loose pallet load with boxes protruding beyond the 90" pallet 4"×6". By use of fork lifts the load is forced through large "funnel plates" hinged against the inside walls of the van. The protruding boxes are physically forced into conformity with the van side walls. As a result, several of the individual boxes will undergo stresses often resulting in container failure and consequent injury to the produce enclosed therein, Furhter, the entire prior art process requires utilization of several lift trucks in order to keep a constant flow of loaded pallets in movement from the packing house dock into the interior of the van.

SUMMARY OF THE INVENTION

An elongate main frame supports a conveyor section, a first tilt station and a second tilt station, each of the tilt stations comprising a pair of right angularly related frames. Adjacent the first tilt station there is a pallet retriever and stacker. In accordance with the method of this invention, palletized loosely cubed tiers of laden produce boxes are accumulated on the conveyor section and successively transferred, one pallet load at a time, onto one of the frames of the first tilt station. The palletized load is then turned 90°, thus orienting the boxes and pallet to rest on the other frame of the first tilt station, on their sides. During the tilting phase, the boxes are gravitationally biased against the second frame, after which opposing pressures are applied against opposite faces of the cubed plurality of boxes in a direction that is parallel to the tilt axis of the first tilt station and maintained until the second frame is in a horizontal position. Thereupon, the on-edge pallet is retrived endwise out of the first tilt station.

A desired number of tiers of containers from the first tilt station are transferred onto a then horizontally disposed frame of the second tilt station. After accumulation of a desired number of tiers in the second tilt station, the second tilt station is turned through 90° to gravitationally bias the containers onto a platen comprising a portion of the other frame of the other tilt station, whereupon opposed pressures are applied against opposite faces of the cuved plurality of containers in the second tilt station with sufficient force to support the recubed boxes or containers independently of the platen when the platen is arrested in a horizontally disposed position. The platen is then displaced by the load platform of a lift truck after which the opposed pressure on the recubed plurality of boxes is relieved and the recubed boxes are thereafter transferred away from the second tilt station.

The first frame of the first tilt station has a plurality of powered rolls oriented for sidewise translation of a pallet forwardly thereonto from the discharge end of the intake conveyor, while the conveyor has means to effect retrograde movement of pallets remaining thereon away from the discharge end after a first pallet has been conveyed forwardly into the first tilt station.

The first tilt station has a pallet track mechanism on which a pallet is supported in vertically extneding position after the first tilt station has been turned through 90°. The lower horizontal edge of the pallet is then supported in a plane lower than the plane of a conveyor means incorporated into the second frame of the first tilt station but the pallet track is elevatable through a parallelogram linkage system to shift the pallet edgwise and, also, incorporates a drive chain for ejecting the pallet longitudinally edgewise out of the first tilt station and into the adjacent pallet retriever and stacker mechanism.

The first frame of the second tilt station and the second frame of the first tilt station each have a conveyor means to effect translation of tiers of containers fromt he second frame of the first tilt station onto the first frame of the second tilt station when these frames are in a coplanar horizontal position. If desired, a fixed horizontally extending conveyor section may be incorporated between the first frame of the second tilt station and the second frame of the first tilt station to serve as an accumulator of on-edge boxes and to thereby increase the frequency of rotation of the first tilt station between load receiving and load discharge position.

The platen in the second frame of the second tilt station is operatively coupled to a hydraulic means that absorbs the force imposed on the platen by the platform of a lift truck driving the platen to a retracted positon, this hydraulic means also acting to move the platen from retracted position to its normal extended position when the platen is relieved of the force imposed thereon by the platform of the lift truck. The platen is fitted with a latch means to prevent displacement of the platen out of its normally extended position and into retracted position upon pivoting of the platen out of a horizontal position when the second tilt station is returned to a load receiving position.

Preferably, the first frame of the second tilt station and the second frame of the first tilt station each mount a conveyor means comprising an array of parallel intermediate rollers over which an endless conveyor belt is trained, each of the rollers being fitted with a pair of laterally spaced apart sprockets, each of the sprockets being in alignment with one of the pair of sprockets of an adjacent roller and every other such pair of aligned sprockets being driveably interconnected by an endless drive chain whereby to drive all of the rollers in unisom upon actuation of a drive roller.

The pallet stacker comprises a vertically disposed framework on which an elevator frame is supported for vertical reciprocatory movement, the elevator frame having a horizontally disposed support means for supporting a vertically diposed on-edge pallet thereon. The elevator frame also has a restraint mechanism engageable with an upper edge of a pallet to normally restrain a pallet in vertically disposed position. A latch means normally holds the elevator frame in a pallet receiving position in alignment with the pallet track assembly of the first lift station.

Fully automatic synchronous operation of the entire produce box restacker and pallet stacker mechanism has been attained employing known control equipment.

BRIEF DESCRIPTION OF THE DRAWINGS

FIG. 12 is a partial side elevational view of a portion of the second tilt station.

FIG. 13 is an end elevational view taken in the direction 13—13 of FIG. 12.

FIG. 14 is a partial transverse sectional view taken on the line 14—14 of FIG. 12.

FIG. 15 is a sectional view on the line 15—15 of FIG. 14.

FIG. 16 is a partial sectional view like FIG. 15 but showing certain of the parts in different positions relative to one another.

FIG. 20 is a fragmentary sectional view, taken on the line 20—20 of FIG. 7, showing a portion of the pallet retrieval system.

FIG. 21 is a fragmentary perspective view of a portion of the pallet retrieval mechanism shown in FIG. 20.

DESCRIPTION OF THE PREFERRED EMBODIMENT

Figure 1:
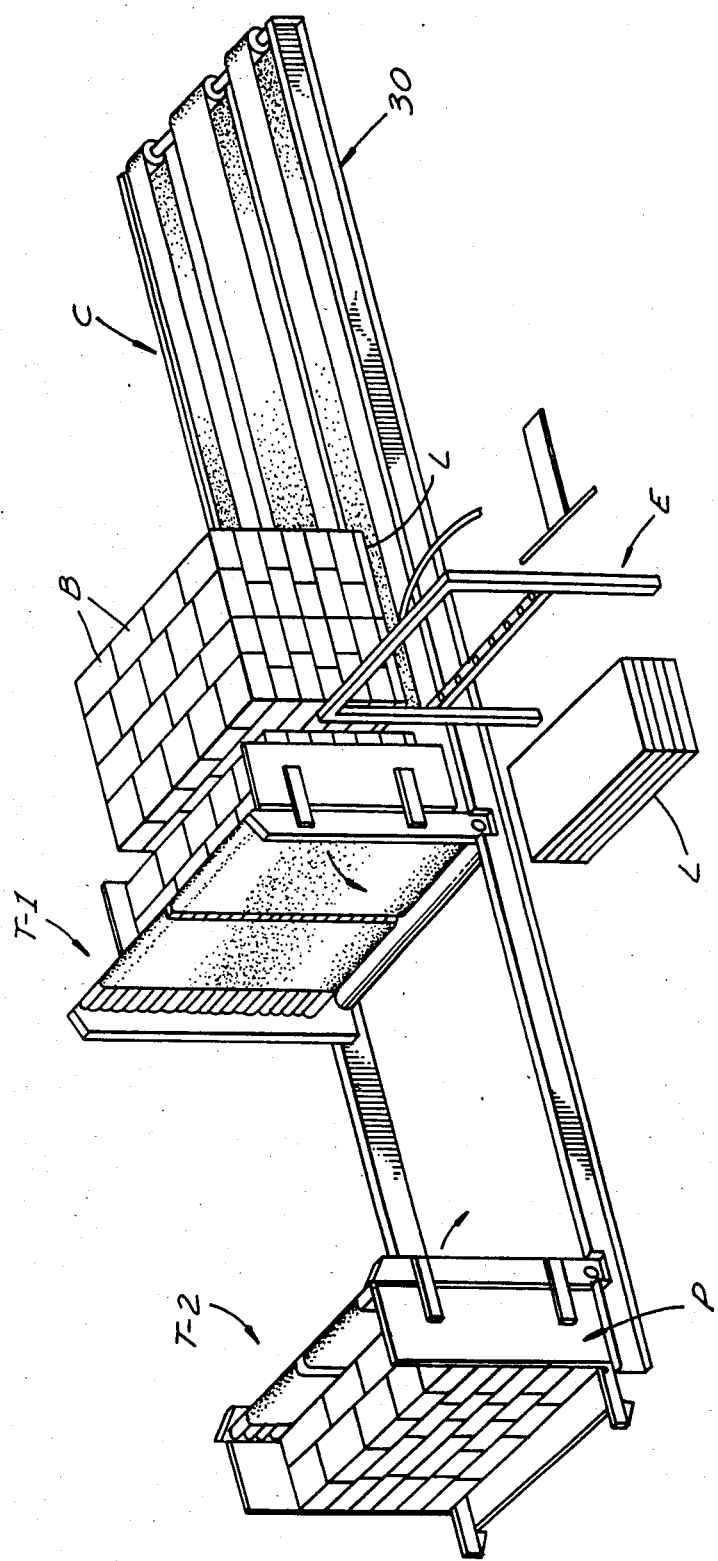
FIG. 1 is a perspective view of the apparatus of this invention.

Referring to FIG. 1, the apparatus of the invention comprises an elongate bed frame 30 on which are mounted an intake conveyor section C, a first tilt station T-1, and a second tilt station T-2 at an exit end of the apparatus. At one side of the machine, adjacent the first station T-1, is a pallet stacker mechanism E.

The invention utilizes conventional packing house pallets L, which are typically on the order of 40×90 inches. At the packing house dock, each pallet is typically loaded with two adjacent rows of four to five boxes to build a stack of six tiers of produce boxes B. In accordance with the invention, the individual boxes B, e.g., loaded with heads of lettuce and having a laden weight on the order of sixty pounds, are placed in inverted position directly on the pallet L or on top of another box B. Preferably, this is done in a manner to keylock the accumulated boxes of a pallet together to a height of about five to six feet, which seems to be a practical limitation imposed by the reach of an ordinary worker. By "keylock" or the like is meant an arrangement wherein adjacent boxes have their long axes oriented 90° to one another. It will, however, by understood that such keylocking is merely optional, the only criterion being that the boxes be stacked on individual pallets L in such manner that when pressed together along each of two orthogonally related axes they can be compressed into a neat cube without any gaps between adjacent boxes.

Figure 2:
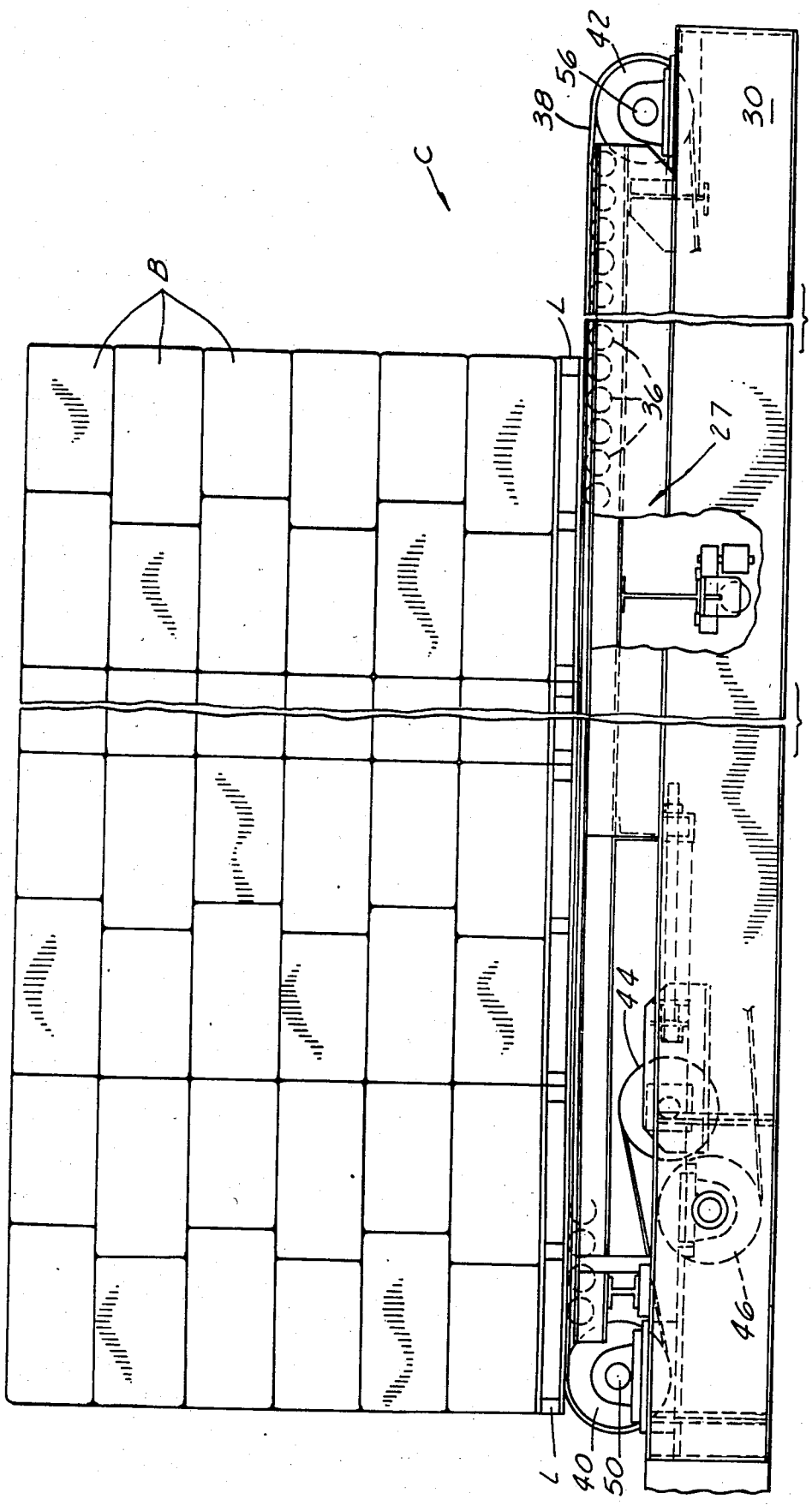
FIG. 2 is a side elevational view of the intake conveyor section of the apparatus in FIG. 1.

After a series of pallets L has been thus loaded at the packing house dock, a forklift truck picks up several loaded pallets L, e.g., six in number, and carries them to the machine schematically illustrated in FIG. 2 to deposit them on the intake conveyor section C, oriented as shown in the drawing.

Figure 9:
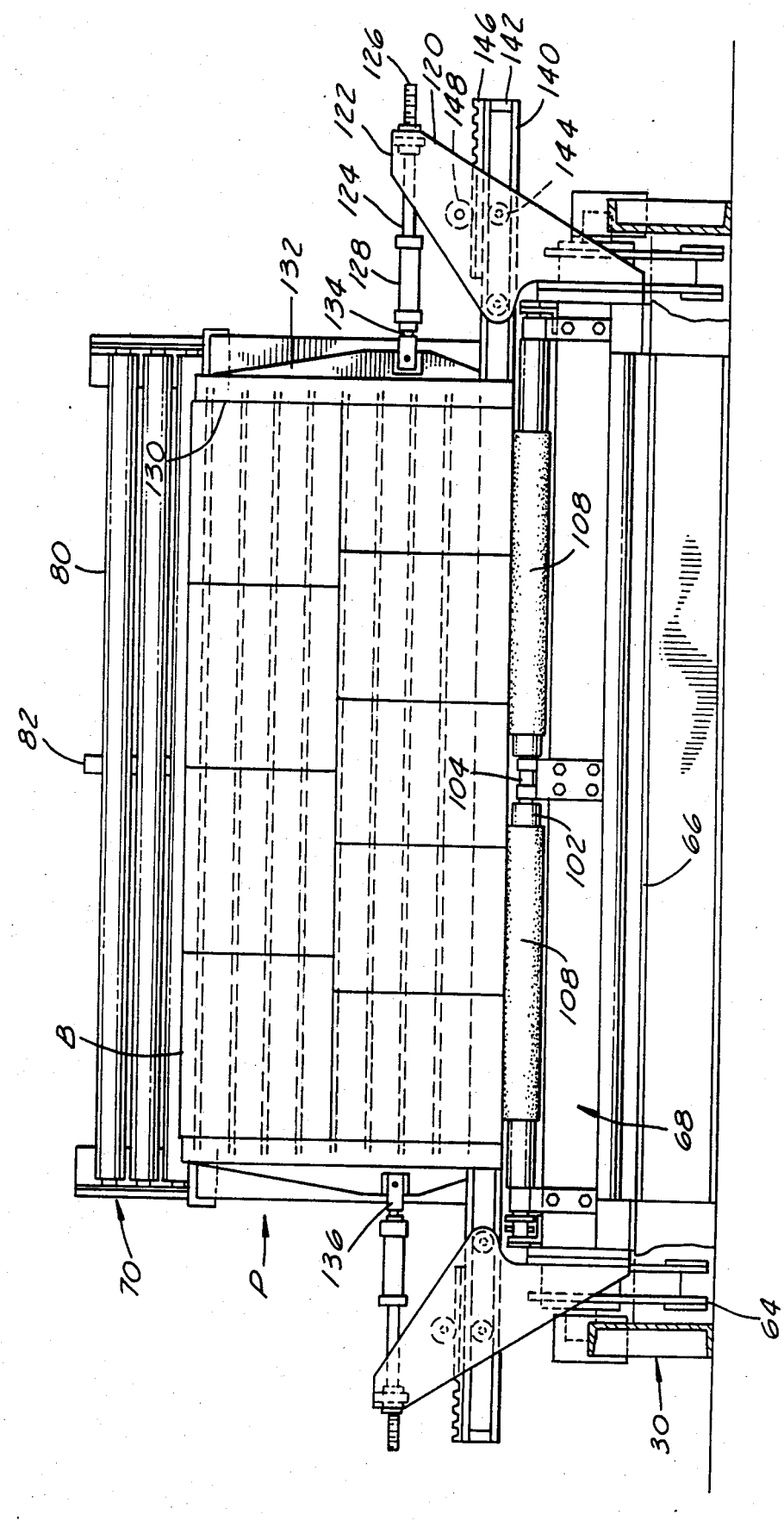
FIG. 9 is a transverse sectional view looking into the first tilt station, taken on the line 9—9 of FIG. 7.
Figure 10:
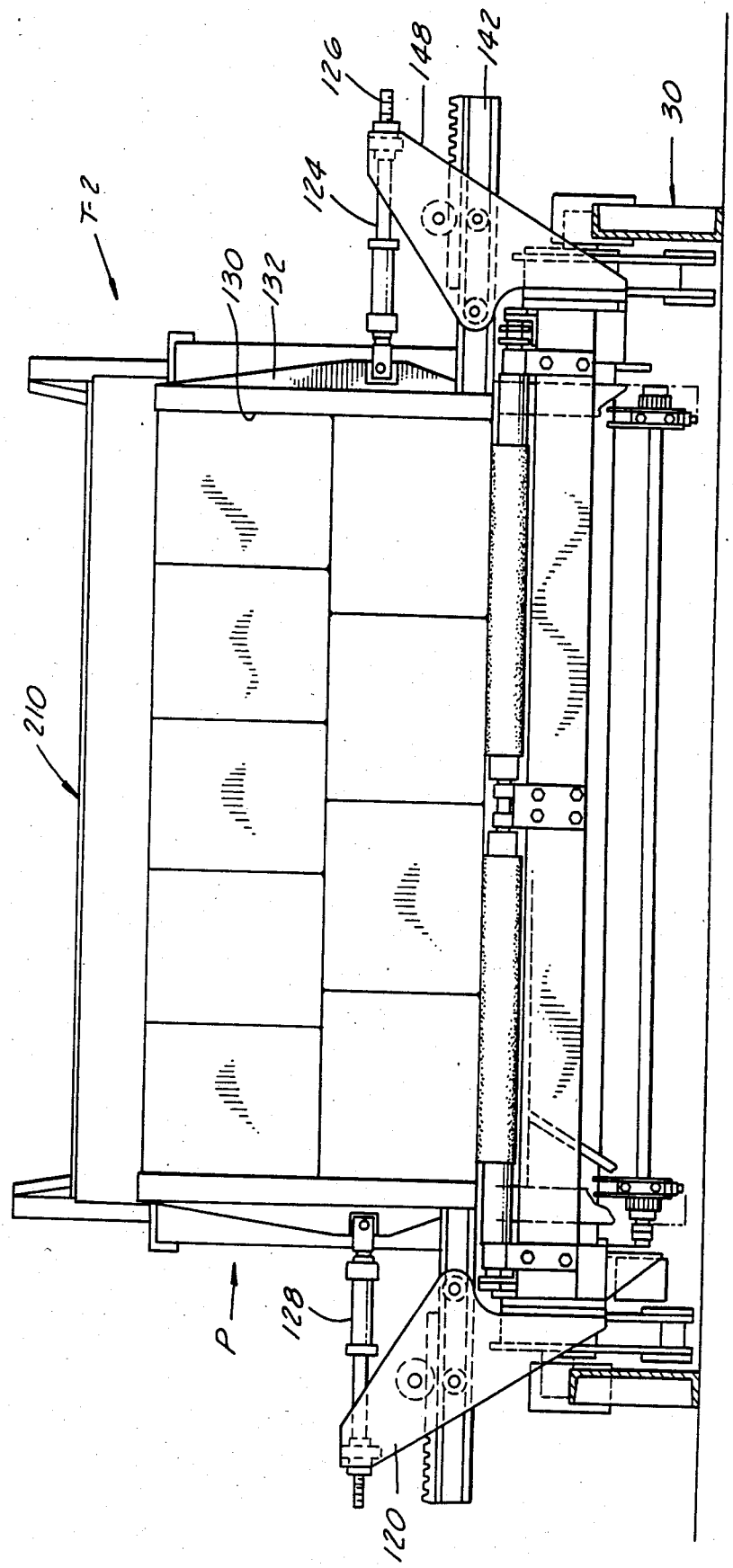
FIG. 10 is a transverse sectional view looking into the second tilt station, taken on the line 10—10 of FIG. 8.

According to the method and apparatus of the invention, an individual pallet load of boxes B is transferred from the conveyor section C onto an intake side of the first tilt station T-1. Thereafter the load is tilted through 90° and, during a phase of this movment, after a substantial portion of the weight of the stack of boxes has been shifted overcenter of the hinge axis of the tilt station, the load of boxes is laterally compressed. At the end of the 90° movement of the first tilt station, the load of boxes is supported on an outlet side thereof in a two-highs tack (FIG. 9).

Assuming an inlet side of the second station T-2 to be in a horizontally disposed position, one or more two-high tiers of on-edge boxes B are transferred from the exit side of the tilt station T-1 onto the intake side of the tilt station T-2. Upon a desired number of tiers of boxes B having been accumulated in the inlet side of station T-2, the latter station is rotated through 90° and, during part of this rotatry movement, the load is again laterally compressed.

Upon completion of the aforementioned 90° movement of the station T-2, an exit side thereof, which comprises essentially a solid rectangular platen, isdisposed horizontally now carrying two rows of a desired number of tiers of the boxes B, right side up. Thereupon, the cubed stack of boxes B can now be retrieved by a lift truck having a solid lift platform, the truck being driven to displace the platen of the station T-2 with the platform of the truck, which thereupon transfers the load into a waiting cargo vehicle.

Figure 5:
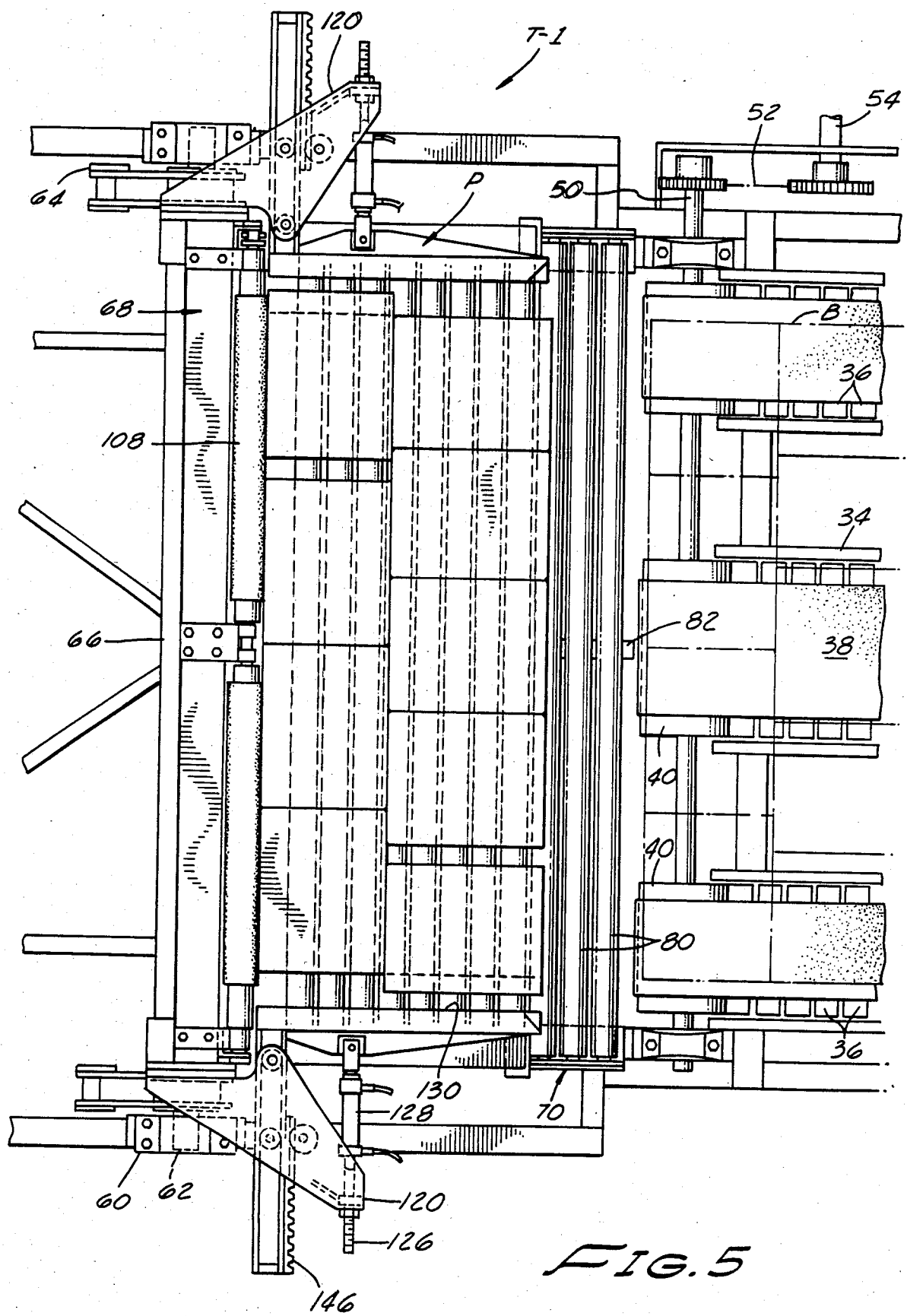
FIG. 5 is a fragmentary top plan view of the firt tilt station taken in the direction of the line 5—5 of FIG. 3.

More particularly, the bed frame 30 comprises an elongate essentially rectangular rigid framework made up of I beams, channels, and other conventional members. As is shown in FIG. 2, the conveyor secton C is located at one end of the apparatus by means of a conventional subframe 32 secured to the bedframe 30. The subframe 32, in turn, mounts three laterally spaced apart endless belt frames 34 extneding longitudinally thereof. As is best seen in FIG. 5, each of the belt frames comprises a parallel pair of elongate rigid bar members between which are mounted a plurality of closely spaced parallel rollers 36, rotatably mounted at their opposite ends on belt frame members 34. The arrangement is such that the upper flight of an endless belt 38 is carried on the upper surfaces of rollers 36, opposite ends of each belt being rained around large diameter rolls 40 and 42.

The lower flight of each endless belt 38 is reversely bent or passed around a large diameter roll 44 positioned in opposition to another large diameter roll 46, on which the belt is again reversed for extension to the corresponding large diameter roll 42 at the inlet end of each belt assembly. As is shown in FIG. 2, rolls 44 serve as take-up rolls for tensioning the endless belts.

Referring to FIG. 5, it will be seen that the three large diameter rolls 40 of the three belt asssemblies are driveably engaged by a coaxial common drive shaft 50 which, at one side of the machine adjacent the conveyor section C, has an endless chain and sprocket connection means 52 through which the common shaft 50 is driven from a power shaft 54. While not shown, it will be understood that the power shaft 54 is connected to an electric motor or some other source of torque. Referring to FIG. 2, the three large diameter rolls 42 at the other end of the belt assemblies are all keyed to a coaxial common support shaft 56.

Figure 3:
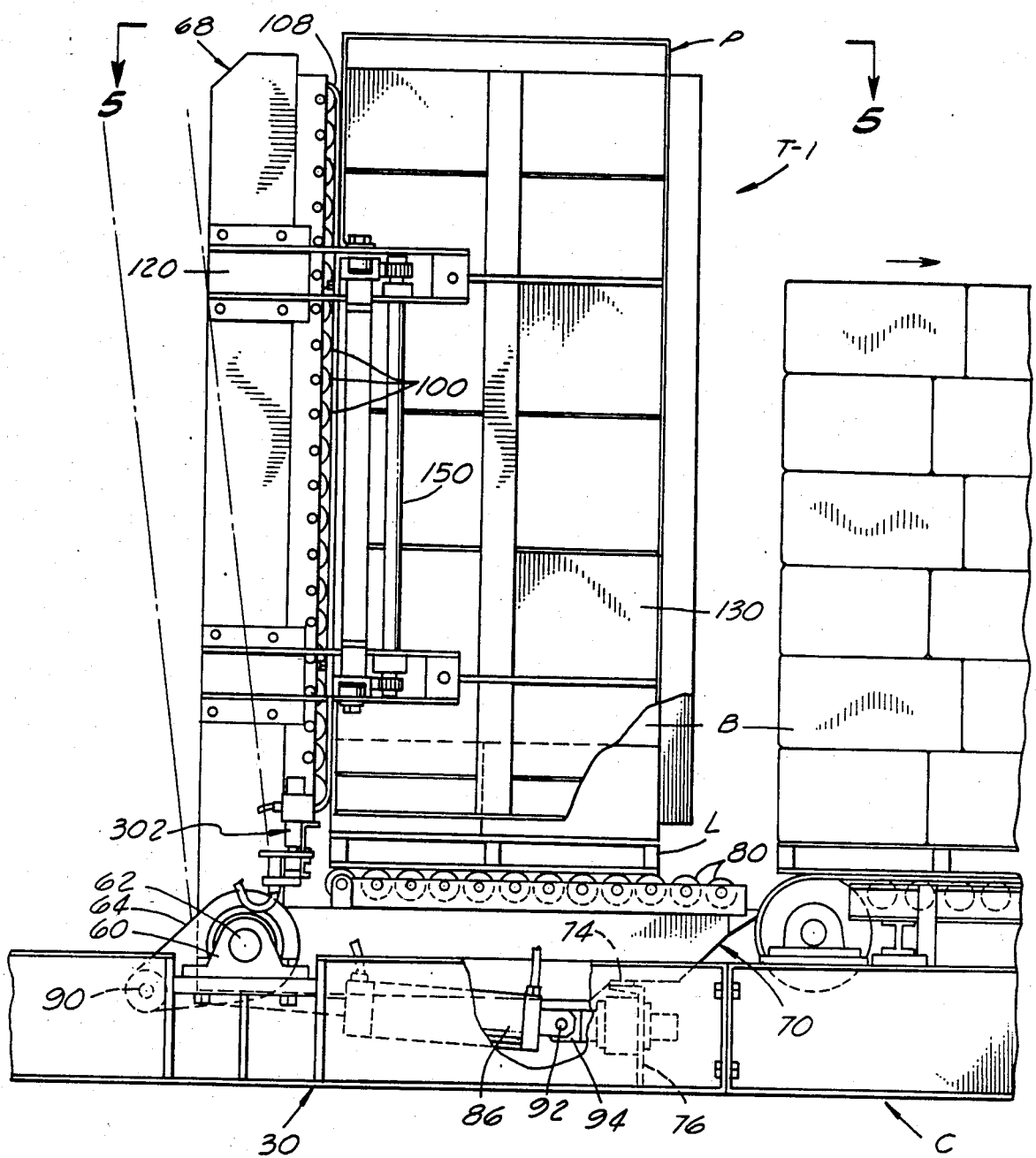
FIG. 3 is side elevational view of the first tilt station of the apparatus of FIG. 1.

The first tilt station T-1 is located immediately adjacent the downstream or outlet end of the conveyor section C. The station T-1 is essentially a trunnion that is tiltable through 90° between a load receiving position and a load discharge position. The station T-1 is illustrated in FIGS. 3 and 5 in its load receiving position and as having just received a pallet load of boxes B that has been transferred thereto from the conveyor section C.

More particularly, the bed frame 30 mounts a pair of pillow blocks 60 ont he opposite sides thereof, serving to suport a coaxial pair of gudgeons 62. the gudgeons 62 support a pair of bell crank assemblies 64 which, in turn, are keyed to opposite ends of a transversely extending tilt station support tube 66. Rigidly secured to the support tube 66 are a pair of frameworks 68 and 70 at right angles to one another.

The framework 70 is a rigid assembly of conventional framing members and is essentially rectangular in configuration. In order to support the station T-1 in the load receiving position, the underside of the framework 70 is fitted with a stop member 74 which, when the station is in the load receiving position, abuts the upper surface of a framing member 76 comprising part of the bedframe 30. The upper side of the framework 70, as viewed in FIG. 3, is fitted with a plurality of closely spaced together parallel rollers 80 whose opposite ends are journalled in the framework. As indicated in the figure, the exposed surfaces of the rollers 80 define a common plane that is essentially coplanar with the upper surface of the endless belts 38 of the conveyor section C. It will also be understood that the array of rollers 80 define an essentially rectangular area geometrically similar to but larger than a pallet L. As indicated in FIG. 5, because of their length the set of rollers 80 is preferably supported at approximately the midpoint by bearings (not shown) on an auxiliary frame member 82 which mounts nesting support bearings.

Preferably, the array of rollers 80 are not merely idlers but are driven in unisom by means of a common power transmission system to be described in detail later in conjunction with other portions of the stations T-1 and T-2.

Figure 7:
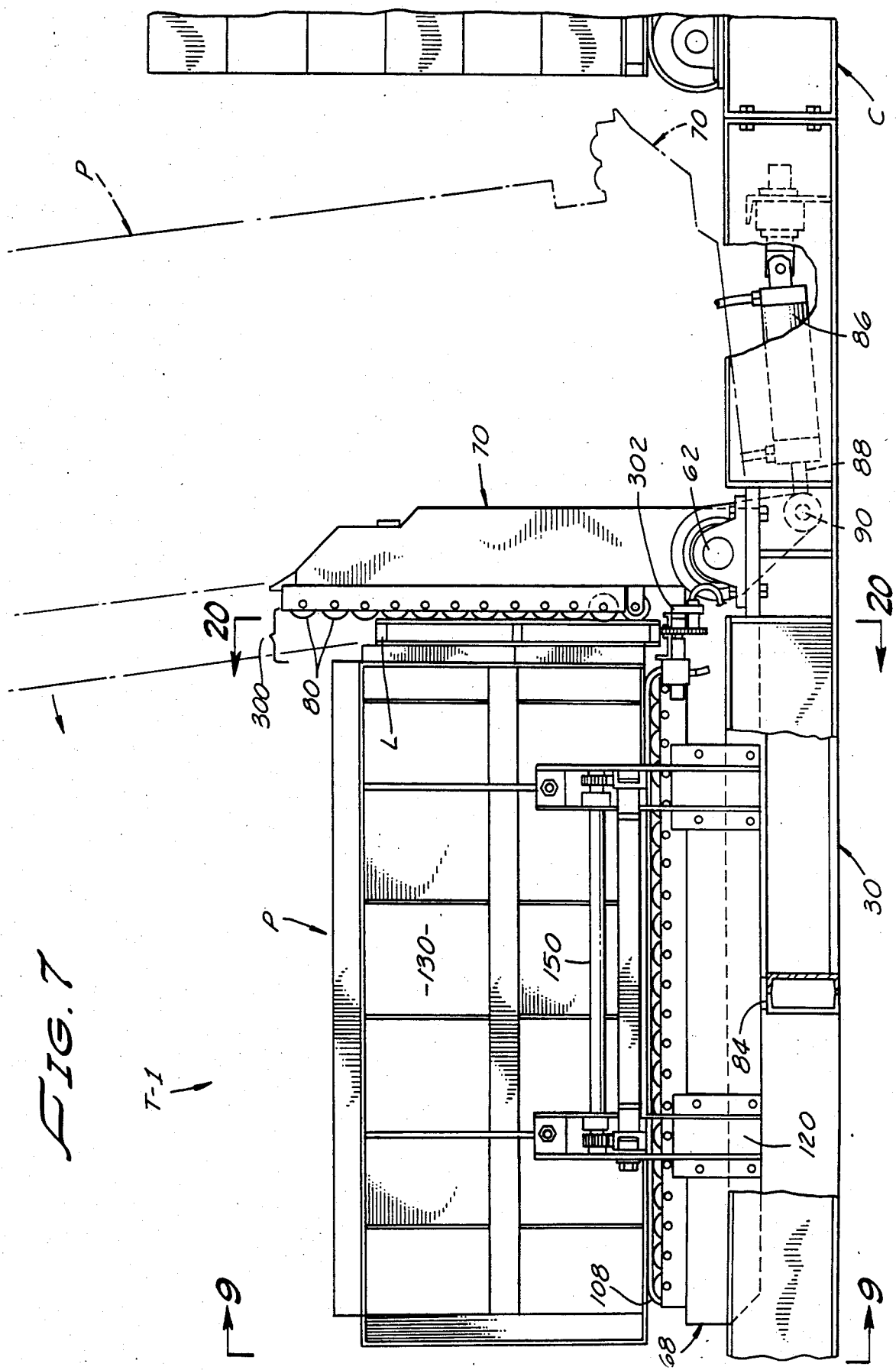
FIG. 7 is a side elevational view of the first tilt station, in its unloading and pallet extracting position.

The other leg or arm of the tilt station T-1 comprises the framework 68 which is also a conventional rigid assembly of framing elements defining an essentially rectangular planform. The station T-1 is shown in FIG. 7 in its discharging position, rotated 90° from the position of FIG. 3, wherein the then underside of the framework 68 abuts the upper surface of a portion of the bedframe 30, as indicated at 84, to define a stop and support for the station in this position. The station T-1 is tilted or turned between the positions of FIGS. 3 and 7 by means of a pair of hydraulic cylinder 86 mounted at opposite sides of the bedframe 30. As shown in the drawings, each of these cylinders has its piston rod 88 pivotally connected to a crankpin 90 mounted at the radially outer end of one of the bell crank assemblies 64, the other end of the cylinder 86 being pivotally connected, as at 92, to a bracket 94 affixed in the bedframe.

Figure 11:
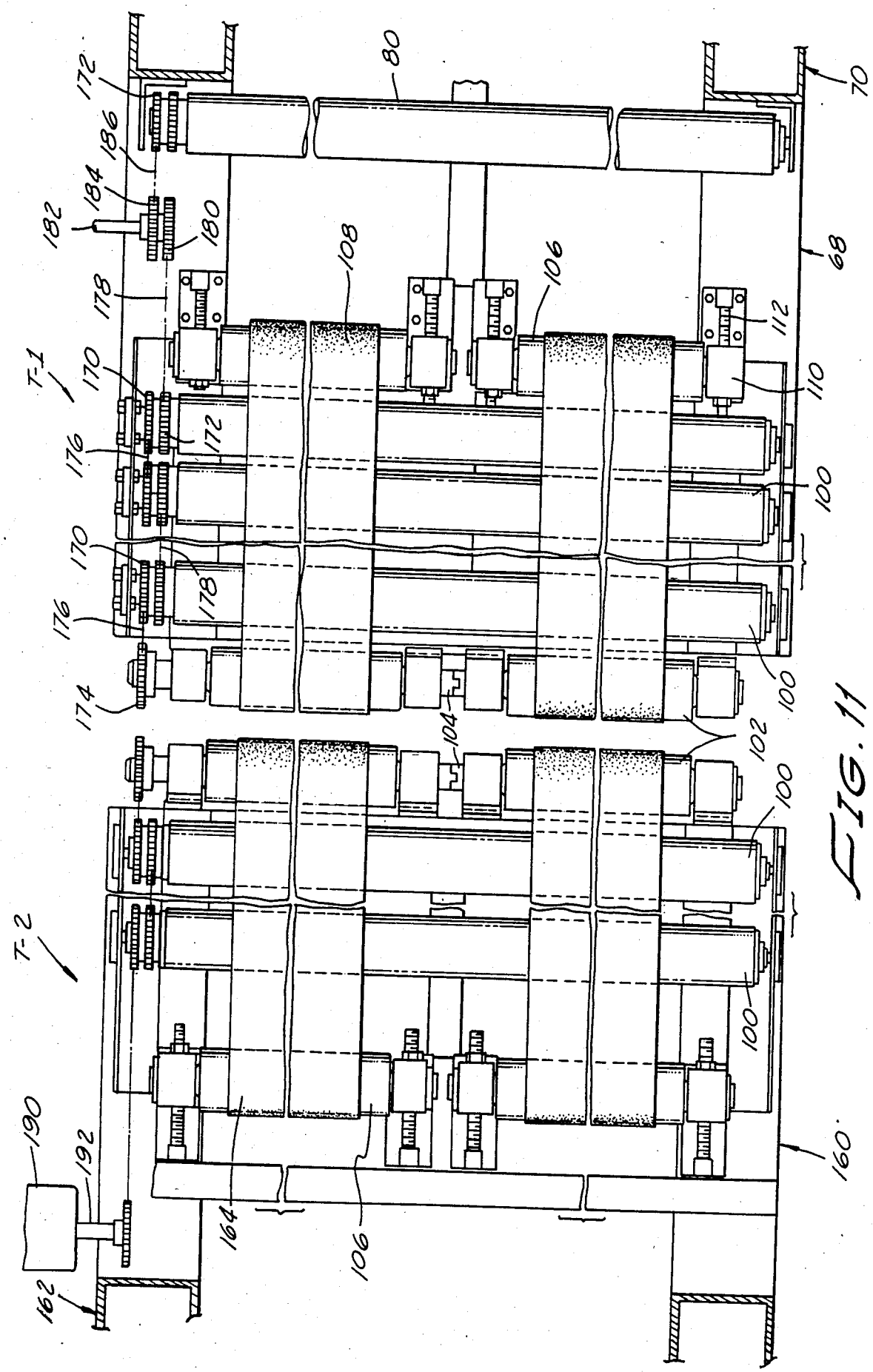
FIG. 11 is a partial top plan view of both tilt station, pictured in positions wherein containers can be shifted from the first tilt station into the second tilt station.

The internal face of the framework 70, which confronts the internal roller bearing face of the framework 68, mounts a plurality of closely spaced parallel rollers 100 on axes parallel to the axes of the rollers 80 of the framework 70. At the radially outer end, the framework 68 also mounts a coaxial pair of rollers 102 of the same diameter as the rollers 100 but codriveably interconnected by a joint 104 (FIG. 11). In similar fashion, a coaxial pair of rollers 106 of the same diameter as the rollers of this set 100, 102 are mounted at the radially inner end of the framework 68. A parallel pair of endless belts 108, of a greater width, as compared to the conveyor belts 38, are trained around the array of rollers 100, 102, 106. As is shown in FIG. 11, in order to properly tension the belts 108, each of the rollers 106, at the radially inner end of the framework 68, has its opposite ends mounted in a pair of bushing blocks 110, secured on the framework 68 by means of a screw adjustment bracket 112. As will be readily apparent, by appropriate coadjustment of the adjustment screw brackets 112, the pair of belts 108 can be appropriately and uniformly tensioned.

The framework 68 is fitted on opposite sides with a pair of parallel pressure plate mechanisms indicated generally at P. These mechanisms are best seen in FIGS. 3, 5, and 9. As can be seen from a comparision of FIGS. 5 and 9, the mechanisms P functon to laterally compress a load of boxes B therebetween. Thus, FIG. 5 schematically indicates the condition of a load of boxes B, comprising several tiers thereof, as initially received in the station T-1, when the mechanisms P are in a retracted condition.

It will be observed that substantial clearances are present between inner faces of the mechanisms P as well as between adjacent ones of the boxes B. After turning of the station T-1 through 90° to the position of FIG. 9, the mechanisms P having been actuated during a phase of the tilting movement to laterally compress the boxes B, all such clearances will have been eliminated.

The pressure plate mechanisms P are essentially identical to one another. Accordingly, but one of them will be described in detail.

More particularly, referring to FIG. 3, each side of the framework 68 fixedly mounts a spaced pair of brackets 120. As can be seen, for example, in FIG. 5, each of these brackets comprises a rigidly interconnected spaced apart pair of rigid plates projecting beyond the plane of the corresponding rollers 100. At an outermost apical portion 122, each bracket mounts a cylinder support rod 124 that is oriented essentially parallel to the rollers 100. The support rod 124 has a threaded portion 126 mounting a pair of locknuts, on opposite sides of a web portion of the apical portion of the bracket 120, whereby each support rod 124 can be axially adjusted. The inner end of each support rod mounts a double acting hydraulic cylinder 128.

Each pressure plate mechanism P includes a rectangular plate 130 that is conventionally reinforced on its back or outer side against bending and torsional strain by a conventional series of reinforcing members including a spaced pair of outwardly projected web members 132. The inner end of a piston rod 134 of each of the cylinders 128 is drivingly interconnected to a portion of the webs 132, as by means of a clevis 136.

On the outer side of each plate 130, along that edge proximal to the rollers 100, a spaced pair of channel shaped guide members 140 are affixed thereto to project outwardly at 90° between the plates defining the bracket 120. At their outer ends, the guide members 140 are fixedly tied together by an interconnected frame member 142 thus further rigidifying the pressure plate 130. Each of the bracket members 10 internally carries a spaced apart pair of guide rollers 144 having rolling engagement with inner surfaces of the corresponding guide channel 140. In order to synchronize movement of the guide members 140 and the corresponding plate relative to the pair of brackets 120, each guide member on an upper face carries a rigidly mounted rack 140 that meshes with a pinion 148 of the corresponding bracket. As is best seen in FIG. 3, the pair of pinions of each pressure plate assembly are secured together for co-rotation by means of a common drive shaft 150 therebetween.

The station T-2 is pivotally mounted by essentially the same arrangement as that for the station T-1. Thus, the bed frame 30 has another pair of coaxial pillow blocks 60 secured on opposite sides thereof mounting a pair of gudgeons 62 to rotatably support opposite ends of a cylindrical tilt station mounting tube 66 therebetween. Each of the opposite ends of the mounting tube 66 is fitted with a bell crank assembly 64 driveably connected to another pair of hydraulic cylinders 86. The station T-2 is thus swingable between the load receiving position of FIG. 8 and the load discharge position of FIG. 4.

Rigidly interconnected to the mounting tube 66 are a pair of right angularly related frameworks 160 and 162. As in the case of the station T-1, the frameworks 160 and 162 are both made up of conventional framing members to define essentially rectangular platforms. At opposite sides, the framework 160 is fitted with a pair of pressure plate mechanisms P which are essentially identical to those of the station T-1.

Referring to FIG. 11, it will be seen that the framework 160 of the station T-2 is fitted with an array of rollers 100, 102 and 106 arranged symetrically, as viewed in the figure, with respect to the corresponding rollers of the framework 68 of the station T-1. These rollers of the station T-2 support a pair of conveyor belts 164 which are like the conveyor belts 108 of the station T-1, with which they are aligned.

In the case of both tilt stations the rollers of the frameworks 68 and 160 are synchronously driven by a sprocket chain syste, shown in FIG. 11. Additionally, in the case of the station T-1, the rollers 80 of the framework 70 are driven from the same power source as that which actuates the rollers 100, 102 and 106 of the framework 68.

More particularly, each of the rollers 100 is coaxially fitted at one end with an adjacent pair of sprockets 170 and 172. At the same side of the framework 68, the roller 102 is fitted with a sprocket 174 in alignment with the sprocket 170 of the adjacent roller 100, with which it is drivingly interconnected by means of an endless chain 176. The sprocket 172 of the same roll 100 is similarly interconnected to the sprocket 172 of the adjacent roll 100 by means of another endless sprocket chain 178. This staggered arrangement of sprocket chains 176 and 178 drivingly interconnecting adjacent rools is repeated throughout the array of rolls 100. At the radially innermost roll 100, another endless chain 178 interconnects the sprocket 172 of that roll to a sprocket 180 driveably connected to a power shaft 182. This power shaft coaxially mounts another sprocket 184 which, by means of another endless chain 186, is connected to a sprocket 172 of the radially innermost roll 80 mounted in the framework 70. The roll 80 is also coaxially fitted with another adjacent sprocket 174 and the array of rolls 80 are each correspondingly interconnected by s similar sprocket and chain drive mechanism.

As has been remarked, the same sprocket and chain power transmission system is utilized for the rolls 100, 102 and 106 of the framework 160 of the station T-2 which, however, has a power source 190 which is separate from that used for driving the rolls of the station T-1.

Figure 8:
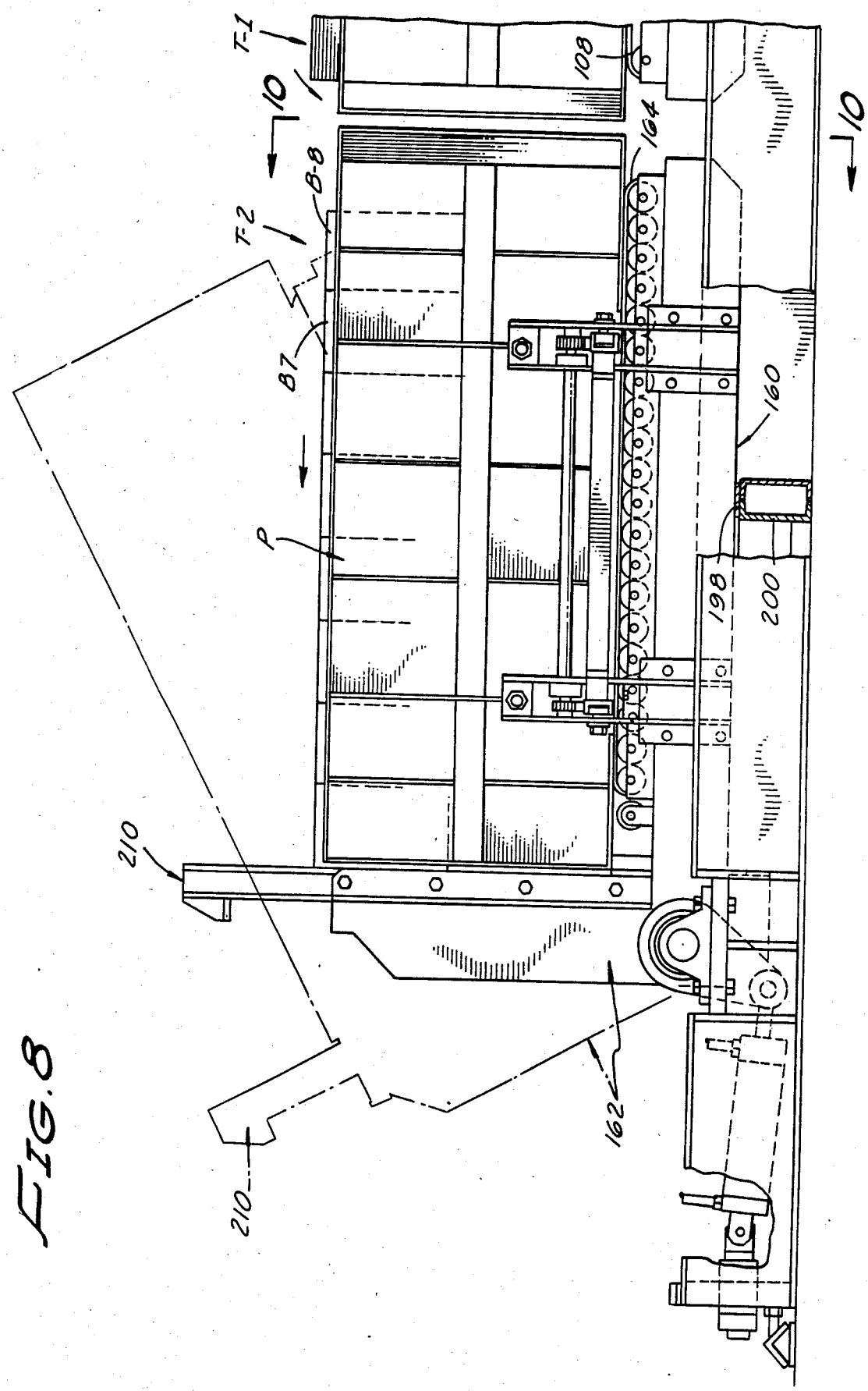
FIG. 8 is another side elevational view of the second tilt station but positioned in load receiving position.

As is shown in FIG. 8, a stop 198 is provided on the underside of the framework 160 to engage the upper face of a frame meber 100 of the bed frame 30. When the station T-2 is in the load receiving position, it will be noted that the upper surfaces of the conveyor belts 164 of the station T-2 are then essentially flush and aligned with the pair of conveyor belts 108 of the station T-1. Similarly, when the station T-2 is in the load discharge position illustrated in FIG. 12 a stop pad 202 on the then underside of the framework 162 engages with the upper face of stop member 204, comprising a portion of the bed frame 30, in order to hold the framework 162 in the desired horizontal orientation.

Figure 19:
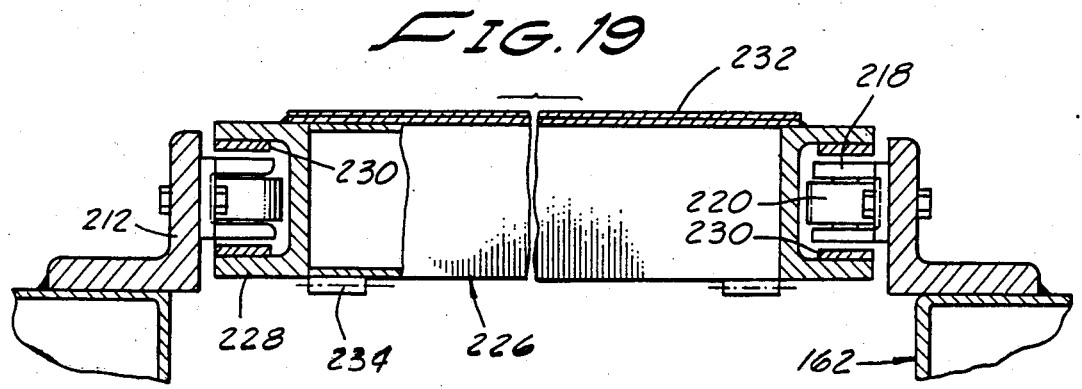
FIG. 19 is a transvese sectional view, on a larger scale, taken on the line 19—19 of FIG. 12.

The framework 162 of the station T-2 mounts a displaceable platen assembly 210. As shown in FIG. 19, opposite sides of the framework 162 rigidly mount a parallel pair of angle members 212. As is shown in FIG. 12, each of the members 212 is fitted at spaced intervals therealong with a plurality of fastener means 214 in order to support a like plurality of roller wheels 216 on the inner faces of the members 212, on axes normal to the inner face of these members. Reverting to FIG. 19, each of the members 212 als has a yoke bracket 218 secured thereto in order to rotatably support one of an opposite pair of roller wheels 220 on an axis normal to the axes of the roller wheels 216.

The platen assembly 210 comprises a rectangular rigid framework 226 including a pair of channel shaped framing members 228 on the opposite sides thereof and opening towards the opposite pair of angle members 212. The confronting inner faces of each of the U-shaped channels 228 are fitted with wear members 230 extending the length thereof which, as indicated in FIG. 13, have rolling engagement with the roller wheels 216. As can be seen in FIG. 19, the roller wheels 220 are also disposed within the channel members 228 and are adapted for rolling contact with the webs of the U-shaped members in order to prevent appreciable lateral displacement of the platen asssembly 210 when it is reciprocated lengthwise along the angle members 212.

Figure 6:
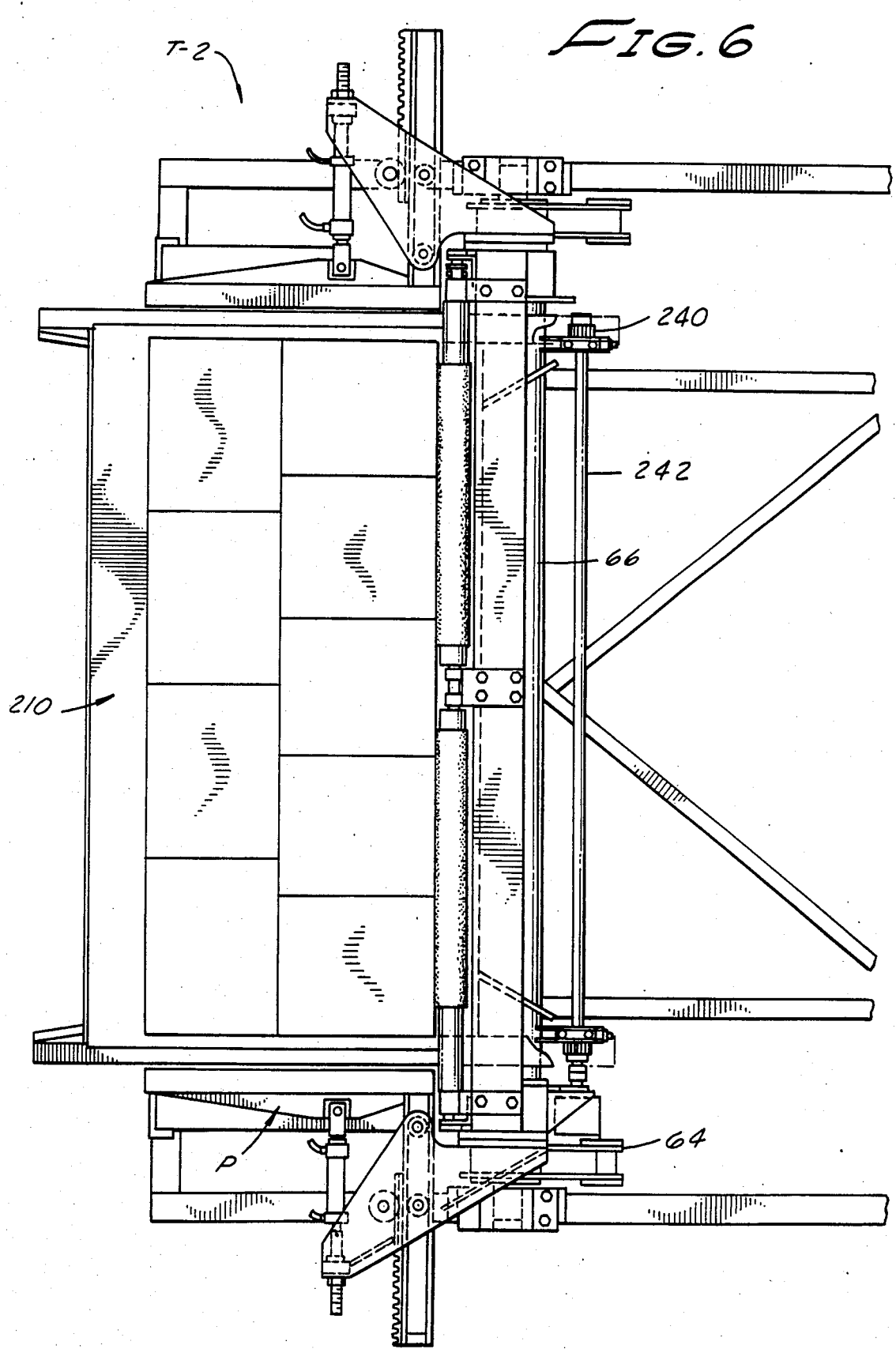
FIG. 6 is a partial top plan view of the second tilt station, taken in the direction of the line 6—6 of FIG. 4.

The upper surface of the platen assembly 210 comprises a smooth, flat sheet 232 which covers substantially all of the upper surface of the platen assembly. In order to further stabilize the platen assembly 210 during reciprocatory movement it is fitted with a rack and pinion system. More particularly, referring to FIGS. 12 and 19, opposite sides of the platen assembly mount a parallel pair of elongate racks 234 on the underside thereof for substantially the entire depth of the platform defined by the platen. As shown in FIG. 6 at the radially inner end of the platen framework 226 and on the opposite sides thereof in alignment with the pair of racks 234 there are mounted a coaxial pair of pinions 240 co-driveably interconnected upon a common shaft 242. Preferably, the mounting brackets for the pinions 240 and their mounting shaft are fitted with a screw adjustment means as schematically indicated in FIG. 12 at 244.

As is shown in FIG. 14, the shaft 242 is connected at one end to a rotary hydraulic motor 248, which is of a type that, when operated in reverse, operates in the mode of a displacement pump. The motor may, for example, be a Nutron DVT-10 hydraulic motor, obtainable from the Nutron Company of Hingham, Mass. As is shown in FIG. 17a, the motor 248 is mounted in a hydraulic circuit having a pump pressurized hydraulic line 292 incorporating a pressure regulator 294a. The motor 248 has inlet and outlet ports 248a and 248b, respectively, and a check valved drain line 296. A bypass line 290 intercommunicates the motor outlet 248b to the pump pressurized line 292 at a point on the low pressure side of the pressure regulator 294b.

In FIG. 17a, the platen assembly 210 is schematically indicated as being at rest in its outwardly displaced position. Accordingly, when the platform is fully extended and resting against rubber cushioned stops (not shown) a pressure of, e.g., approximately 700 p.s.i. is maintained at port 248a by regulator 294a and a back pressure of approximately 50 p.s.i. is maintained at port 248b by a regulator 294b in bypass 290 while the motor is inactive. When the platform 256 of the lift truck R is thrust against the outer edge of the platen 210, reverse rotation of the hydraulic motor exerts a pressure at port 248a in excess of 700 p.s.i. and causes a reduction in pressure at port 248b. The reduction in pressure port 248b is compensated for by response of regulator 294b which draws its supply from bypass line 290, a high pressure supply source. Essentially the fluid is travelling in a closed circuit with pressures at ports 248a and 248b maintained in a consistent ratio.

When a load of cubed boxes B is withdrawn from the station T-2 by the lift truck R backing away therefrom, the pressure maintained at port 248a, e.g., 700 p.s.i, by regulator 294a drives the motor in a direction that moves the platen out to its normal resting position. The fluid which passes through the motor to port 248b is relieved to tank drain by a check valve 296b which is pre-set to relieve pressure at 65 p.s.i., slightly higher than the pressure maintained by regulator 294b of 50 p.s.i.

Figure 17:
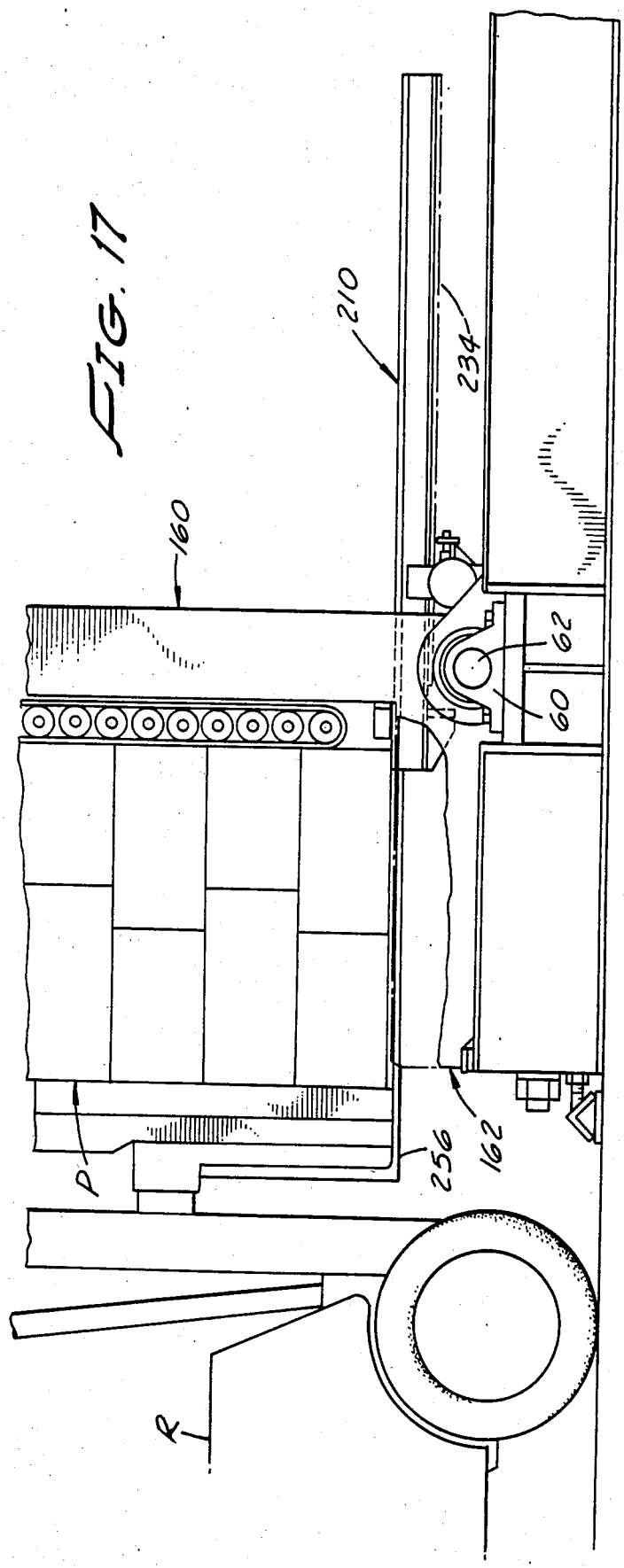
FIG. 17 is a partial side elevational view of the exit end of the apparatus of FIG. 1 also schematically showing a lift truck in readiness to retrieve a restacked load of containers from the apparatus.
Figure 17A:
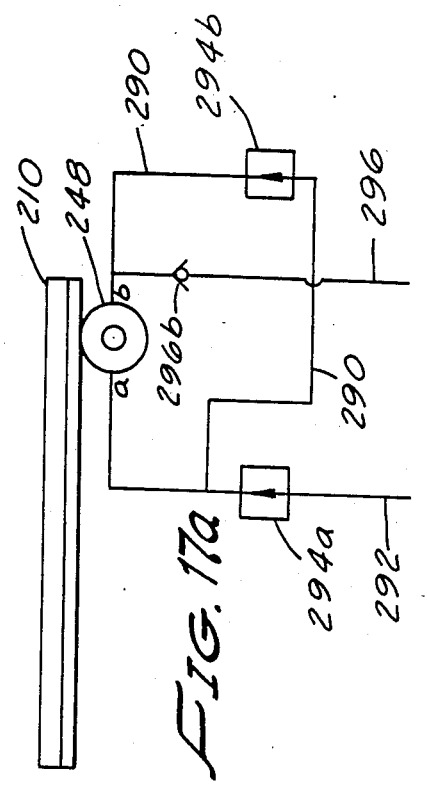
FIG. 17a is a schematic diagram of a hydraulic control circuit operatively associated with a displaceable platen of the second tilt station.
Figure 18:
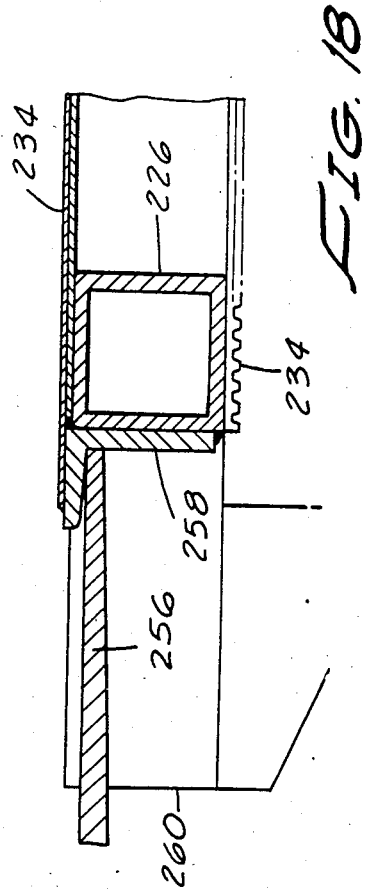
FIG. 18 is a partial sectional view, on a larger scale, illustrating the operative relationship of a portion of the lift truck of FIG. 17 relative to the exit end of the apparatus of the invention.

As indicated in FIG. 17, the platen assembly 210 is displaceable from its normal load supporting position by the platform 256 of a lift-truck, designated generally at R. Referring to FIG. 18 it will be seen that the outermost end of the platen assembly 210 is fitted with an angle member 258 under whose horizontally extending leg the lift platform 256 of the truck R is received. In order to provide a lateral guide means for opposite sides of the lift plate 256 of the truck L, each of the channel members 228 at its outer end is fitted with a short plate 260, the pair of plates 260 being inwardly convergent in order to guide the lift plate 256 into the proper engagement with the platen 210.

It will be appreciated that the platen or platform 210 is heavy. Accordingly, a latching means is provided in order to prevent movement of theplatform assembly 210 out of its extended position when the platform is swung out of the horizontal position.

More particularly, as is shown in FIG. 13 the mounting tube 66 of the station T-2 is fitted on one side with an upwardly projecting brcket 270. At its upper end, the bracket 270 mounts a pin 272 that pivotally mounts a latch member 274. As is shown in FIG. 15, the latch 274 is essentially parallel to the mounting tube 66 as well as to the rear face of a transverse box beam framing member 276 of the platen assembly 210.

As is shown in FIG. 13, the latch member 274 has oppositely extending arms, one of which is fitted with a roller 280 which is engageable with the upper face of a bracket member 282 that extends upwardly from a framing member 284 of the bed frame 30, to which it is secured. The other arm of the latch member 274 carries a laterally projecting arm 286 whose outer end mounts one end of a tension spring 288 whose other end is connected to a bracket 290 secured to the mounting tube 66.

The roller 280 of the latch 274 is engaged by the upper end of the bracket 188 only when the platform assembly 210 is in the horizontal postion. In FIG. 13, the solid outline representation of the latch 274 represents its inactive condition, the spring 288 then being under tension. When the station T-2 is turned out of the position of FIG. 13 towards the load receiving position, as indicated in FIG. 16, the roller 280 is released from engagement with the bracket 282, whereupon the spring 288 effects movement of the latch member to the dotted outline position shown in FIG. 13. Thereupon, the latch member 272 is swung into position behind the framing member 276, thus providing a positive stop against displacement of the platform assembly 210 in a radially inward direction.

Considering now the operation of the restacker invention, let it be assumed that the conveyor section C is loaded with a plurality of pallets L each bearing two rows of six tiers of the boxes B, as indicated in FIG. 2. Let it also be assumed that the station T-1 is in the pallet receiving postion indicated in FIG. 3 with its short arm or framework 70 horizontally disposed. The station T-1 being assumed to be empty, the conveyor belts 28 of the conveyor section C are now actuated by means of the power shaft 54 while, simultaneously, the rolls 80 of the framework 70 are rotated by their separate power system at substantially the same lineal speed as that of the converyor belts 38. After a single pallet L with its load of boxes B has been transferred into the station T-1 and into abutment with the conveyor belts 108, the rolls 80 are de-energized, as are the conveyor belts 38 of the conveyor section C. Thereupon, the conveyor belts 38 of the conveyor section C are re-energized by reverse rotation of their power shaft 54 to effect backing off of the loaded pallets L remaining on the conveyor section C to provide sufficient clearance, as indicated in FIG. 3, to permit subsequent turning of the station T-1 through 90°.

It will be understood that during transfer of a loaded pallet L into the station T-1, the presure plate mechanisms P thereof are in a retracted position as indicated in FIG. 5. Accordingly, ample clearance is provided between the pressure plate mechanisms P to accomodate the full width of the pallet load of boxes, including the gaps which are present between boxes, as indicated in the figure. At this point, the hydraulic cylinder 86 of the station T-1 are actuated to rotate the station 90° from the position of FIG. 3 into that of FIG. 7. The pressure plates P are maintained in their retracted position through about 75° of rotation. Accordingly, as the load of boxes B moves overcenter of the pivotal axis 62 of the station T-1 an increasing proportion of the weight of the boxes is shifted from the rollers 80 of the intake side of the station onto the rollers and conveyor belts 108 of the outlet side of the station. Thus, as the framework 68 defining the outlet side of the station T-1 approaches the horizontal, lower tiers of the boxes B have less weight imposed thereon. At about 75° of rotation, the pressure plate mechanisms P are actuated to extend themselves towards one another to exert lateral compressive force on the entire pallet load of the boxes to tightly cube them. In this connection, the pressure plate actuating cylinders 128 have a fixed stroke and are so mounted on their adjustment screws 126 that positive stops limit the extension of the pressure plates' surfaces 130 just sufficiently to remove all of the gaps between adjacent boxes B, as indicated in FIG. 9. It will now be appreciated that since most of the weight has been taken off the lower boxes B that all of the boxes B of the pallet load can be tightly stacked without utilizing excessive compressive forces, thus avoiding injury to the boxes and their contents. When the framework 68 of the station T-1 is in the horizontal position the pressure plate cylinders 128 of the station T-1 are again actuated in a direction to retract the pressure plate mechanisms.

Let it now be assumed that the stations T-1 and T-2 are both in the positions of FIG. 8, the pressure plate mechanism P of both stations being in retracted positions. Thereupon, upon simultaneous energization of the belts 108 of the station T-1 and the belts 164 of station T-2, a full pallet load of six tiers of the boxes B is transferred out of the station T-1 and into the station T-2. However, any greater or lesser number than six tiers of the boxes B can be so transferred, depending upon the characteristics of the load which it is desired to ultimately dispose in the waiting cargo vehicle. Thus, if it is desired that the next bank of boxes which it is desired to load into the vehicle comprises two rows of eight tiers of the boxes B, the station T-1 can now be turned back to its intake position to receive another load of containers stacked six high which is then tilted in the manner described previously into the transfer position depicted in FIG. 8. Thereupon, the conveyor belt 108 of the station T-1 can again be actuated simultaneously with the conveyor belts 164 of the station T-2, or independently thereof, to effect transfer of another two tiers of the boxes B into the station T-2. Accordingly, as dpecited in FIG. 8, two additional tiers B-7 and B-8 have been shifted from the station T-1 into the station T-2.

Figure 4:
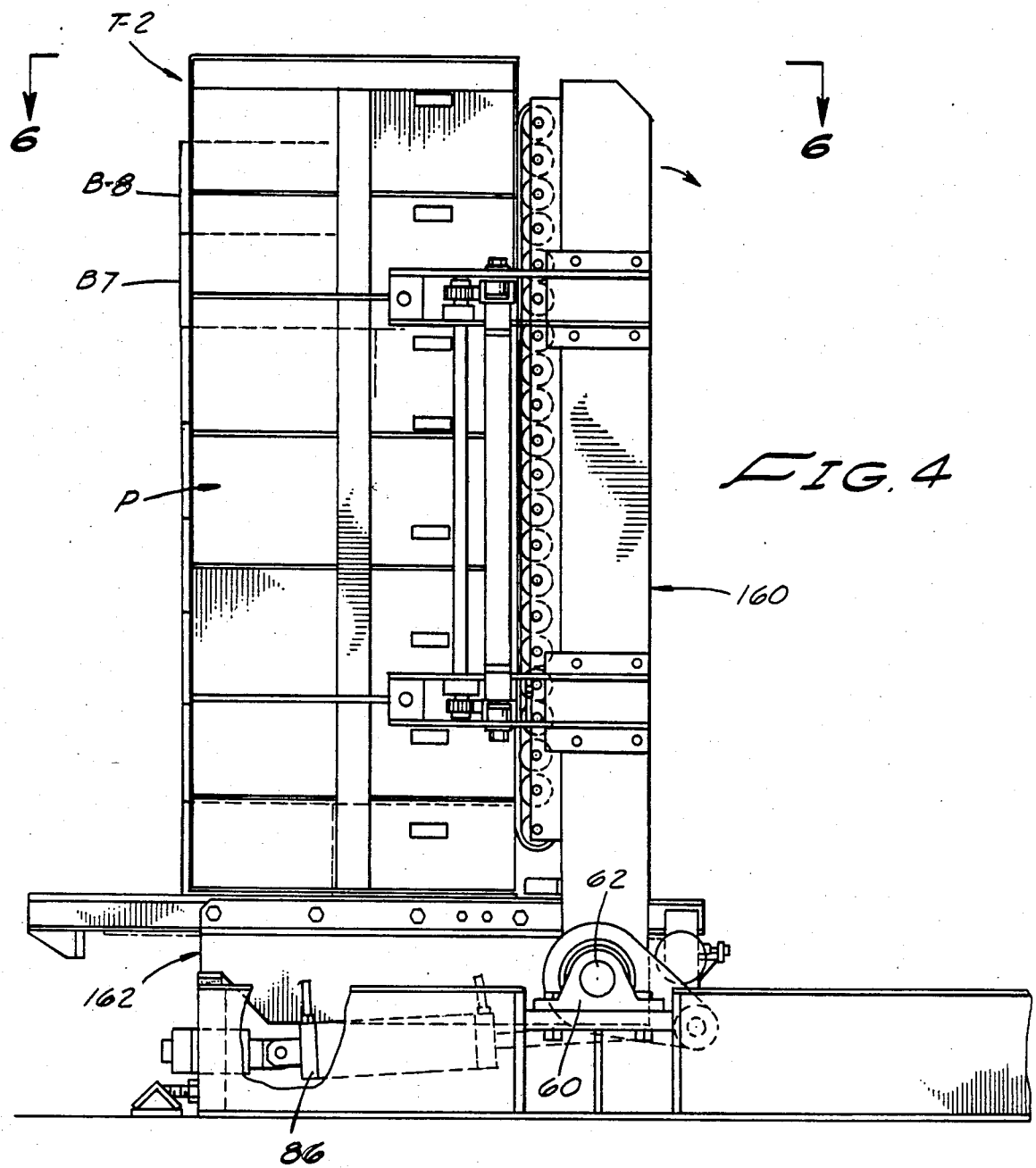
FIG. 4 is a side elevational view of the second tilt station of the apparatus in recubed load delivery position.

The station T-2 then having been loaded to the desired extent, hydraulic power cylinders 86 are now actuated to rotate the station from the position of FIG. 8 into the unloading orientation of FIG. 4. After about 15°-30° of rotation, the pressure plates are actuated to extend them and laterally compress the boxes B therebetween in a tight cube.

Clamping or cubing pressure is maintained on the pressure plates P of the station T-2 after its framework 162 has attained the horizontal attitude of FIG. 4. Thereupon, as shown in FIG. 17, the forward edge of the platform 256 of the lift truck R is thrust against the adjacent end of the platen 210 to drive the platen inwardly to its full extent, whereupon the pressure plate mechanisms P of the station T-2 are actuated to withdraw the pressure plates and the load of the tighly cubed boxes B is thereupon transferred onto the platform 256 of the lift truck R.

Upon backing off the by loaded lift truck R, the motor 248 now operates in its motor mode, in the manner previously described, and effects outward displacement of the platen assembly 210 to fully extended position. The platen 210 now being empty, the station T-2 can be returned to the load receiving position of FIG. 8. During this return movement of the station T-2, the latch 272 is swung into its platen locking position, as indicated in FIG. 17. Thus, when the station T-2 is disposed in the load receiving postion of FIG. 8, the platen 210 is securely held against any displacement under the influence of gravitational forces.

As is shown in FIG. 1, the pallet mechanism E is located adjacent the station T-1. Referring of FIG. 7, wherein the station T-1 is depicted in the unloading position, it will be observed that there is a gap 300 between the rollers 80 of the framework 70 and the adjacent edge of the pressure plate mechanism P, providing a clearance for the sideward passage therethrough of a now verticlaly disposed pallet L into the pallet stcker mechanism E.

More particularly, as is shown in FIG. 20, the framework 68 of the station T-1 mounts a pallet track assembly 302 extending transversely thereof and upon which a pallet L is supported when the station is in the position depicted in FIG. 7. As is shown in FIG. 21, the assembly 302 comprises an upwardly open channel member 304 affixed on top of a guide tube 306. An endless pallet drive chain 307 has its upper flight slidably disposed in the channel member 304, opposite ends of the chain being trained around a drive sprocket 308 and an idler sprocket 310 mounted at opposite ends of the asembly 320. The lower or return flight of the chain 307 is conducted through tubular member 30 of the pallet track assembly. The drive sprocket 308 is driven by a hydraulic motor 312 connected to a power source by a flexible hose 314. The lower flight of the chain 307 is drivingly engaged with one end of a flexible drive cable 316 whose other end is interconnected to a drive wheel 318 mounted in the pallet stacker mechanism E.

As shown in FIG. 20, the track assembly 302 is moveable between a normal position, in which it is supported on the upper surface of the framework 68, and an upwardly extended position. For this purpose, the underside of the framework 68 is fitted with an auxiliary framework 320 to pivotally support one end of a hydraulic power cylinder 322 whose other end is pivotally connected to the underside of the track assembly 302. A spaced apart pair of parallel links 324, 326 are each mounted with one end pivotally connected to the track assembly 302 and their other ends pivotally connected to the framework 68 and auxiliary framework 320. Accordingly, the track assembly 320 undergoes parallel movement between the normal and extended positions in order to maintain a pallet carried thereon in a horizontal attitude.

The motor 312 for the pallet track assembly is inactive at all times except when a pallet L is to be ejected from the station T-1. Thus, assuming the station T-1 to be in the attitude shown in FIG. 7, the hydraulic cylinder 322 is first actuated to raise the track assembly 32 to the phantom line position indicated in FIG. 20. Thereafter, the motor 312 is energized to drive the endless belt 307 and the drive wheel 318 of the pallet stacker mechanism E synchronously whereupon the pallet L is ejected sidewardly out of the restacker machine in the direction of the arrow 328.

As indicated in FIG. 7, the upper surface of the pallet track assembly which bears the weight of the pallet is normally disposed in a plan lower than the plane of the blets 108 on which the boxes B are carried. Thus, after the load of boxes has been turned from the load recieving position of the staiton T-1 to the position of FIG. 7, the pallet L drops into engagement with the chain belt 307 to be retained by the upstanding flanges of the track member 304 so that upon energization of the belts 108 the pallet L cannot be carried along with the boxes B.

While the invention has been explained in detail, it is to be understood that the invention is not limited in its application to the details of construction and the arrangements of the components set forth in the description or illustrated in the drawings. The invention is capable of other embodiments and of being practiced and carried out in various ways. Also it is to be understood that the phraseology and terminology employed herein is for the purposes of description and should not be regarded as limiting.

I claim:

1. A method of tightly cubing a plurality of containers into a plurality of adjacent rows each having a plurality of tiers of the containers, comprising:

loading a plurality of the containers onto a pallet in a plurality of adjacent rows, each row having a plurality of tiers, thus defining a cubed plurality of the containers gravitationally biased together onto the pallet;

positioning the palletized cubed containers with a vertical side adjacent a vertically disposed first planar surface;

tilting the palletized containers and first planar surface about a common horizontal axis in a direction to gravitationally bias the containers onto the first planar surface to pack the containers together in a direction normal to the first planar surface while maintaining their gravitational bias onto the pallet; and, after a portion of the weight of the palletized containers has passed over said axis and the gravitational bias of the containers onto the pallet has thus been diminished, initially applying opposing pressure against opposite faces of the cubed plurality of containers in a direction that is parallel to the tilt axis to pack the containers together in a direction parallel to the first planar surface.

2. The method of claim 1 including:

initially loading the containers onto the pallet in inverted position;

releasing the opposing pressures from opposite faces of the cubed containers after the first planar surface has been arrested in horizontal position;

retrieving the pallet by translation thereof lengthwise out of its position in registration behind the cubed containers;

transferring a desired number of tiers of the cubed containers from the first planar surface onto a second adjacent coplanar surface; and after all tiers have been removed from the first planar surface, returning the first planar surface to its original vertically extending position in readiness to receive successive palletized cubed containers.

3. The method of claim 2, including:

accumulating a desired number of tiers of containers on the coplanar surface from the first planar surface and against an upright platen;

tilting the containers on the second coplanar surface and the platen about a second common horizontal axis in a direction to gravitationally bias the containers onto the platen to pack the containers together in a direction normal to the platen while maintaining their gravitational bias onto the second coplanar surface;

after a portion of the weight of the containers has passed over said second axis, applying opposing pressure against opposite faces of the cubed plurality of containers in a direction that is parallel to the second tilt axis to pack the containers together in a direction parallel to the second coplanar surface; and arresting the tilting of the platen in a horizontal position with the cubed containers in upright condition.

4. The method of claim 3, including:

displacing the platen edgewise, out of registration with the cubed containers thereover, with a solid surface;

thereafter releasing the opposing pressure on the cubed containers to transfer the weight of the upright cubed containers onto the solid surface; and thereafter transporting the upright cubed containers on said solid surface away from the platen and second coplanar surface.

5. A method of tightly cubing a plurality of containers into a plurality of adjacent rows, each having a plurality of tiers of the containers, comprising:

loading a plurality of inverted containers onto a pallet in a plurality of adjacent rows, each row having a plurality of tiers, thus defining a cubed plurality of the containers gravitationally biased together onto the pallet;

positioning the palletized cubed containers with a vertical side adjacent a vertically disposed first planar surface;

tilting the palletized containers and first planar surface through ninety degrees aobut a common horizontal axis in a direction to gravitationally bias the containers onto the first planar surface to pack the containers together in a direction normal to the first planar surface;

transferring a desired number of tiere of the cubed containers from the first planar surface onto a second adjacent coplanar surface;

accumulating a desired number of tiers of containers on the coplanar surface from the first planar surface and against an upright platen;

tilting the container on the second coplanar surface and the platen about a second common horizontal axis in a direction to gravitationally bias the containers onto the platen to pack the containers together in a direction normal to the platen;

applying opposing pressure against opposite faces of the cubed plurality of containers in a direction that is parallel to the second tilt axis to pack the containers together in a direction parallel to the second coplanar surface;

arresting the tilting of the platen in a horizontal position with the cubed containers in an upright condition;

displacing the platen edgewise, out of registration with the cubed containers thereover, with a solid surface;

thereafter releasing the opposing pressure on the cubed containers to transfer the weight of the upright cubed containers onto the solid surface; and thereafter transporting the upright cubed containers on said solid surface away from the platen and second coplanar surface.

* * * * *